US008592089B2

(12) United States Patent
La et al.

(10) Patent No.: US 8,592,089 B2
(45) Date of Patent: Nov. 26, 2013

(54) IN-SITU PORE GENERATION IN LEAD-ACID BATTERY SEPARATOR USING ELECTROLYTE-SOLUBLE PORE FORMER

(75) Inventors: Chi Thuong-Le La, Happy Valley, OR (US); Robert R. Waterhouse, Scio, OR (US); Richard W. Pekala, Corvallis, OR (US)

(73) Assignee: Amtek Research International, LLC, Lebanon, OR (US)

( * ) Notice: Subject to any disclaimer, the term of this patent is extended or adjusted under 35 U.S.C. 154(b) by 581 days.

(21) Appl. No.: 12/600,226

(22) PCT Filed: May 15, 2008

(86) PCT No.: PCT/US2008/063784
§ 371 (c)(1),
(2), (4) Date: Nov. 1, 2010

(87) PCT Pub. No.: WO2009/023329
PCT Pub. Date: Feb. 19, 2009

(65) Prior Publication Data
US 2011/0045339 A1    Feb. 24, 2011

Related U.S. Application Data

(60) Provisional application No. 60/938,137, filed on May 15, 2007, provisional application No. 60/954,530, filed on Aug. 7, 2007.

(51) Int. Cl.
*H01M 2/16* (2006.01)

(52) U.S. Cl.
USPC ........... 429/252; 429/247; 429/249; 429/250; 429/251; 429/254

(58) Field of Classification Search
USPC .......... 429/163, 247, 249, 250, 251, 252, 254
See application file for complete search history.

(56) References Cited

U.S. PATENT DOCUMENTS

| | | | |
|---|---|---|---|
| 3,351,495 A | 11/1967 | Larsen et al. | |
| 6,148,503 A * | 11/2000 | Delnick et al. | 29/623.1 |
| 6,524,742 B1 * | 2/2003 | Emanuel et al. | 429/129 |
| 2002/0034689 A1 * | 3/2002 | Hoshida et al. | 429/254 |
| 2003/0219587 A1 | 11/2003 | Pekala | |
| 2004/0229116 A1 * | 11/2004 | Malinski et al. | 429/144 |
| 2006/0121269 A1 * | 6/2006 | Miller et al. | 428/317.9 |

OTHER PUBLICATIONS

Stein, Harvey L., Ultra High Molecular Weight Polyethylene (UHMWPE), Engineered Materials Handbook, 1999, pp. 167-171, vol. 2, ASM International, Materials Park, Ohio.

* cited by examiner

*Primary Examiner* — Sean P Cullen
(74) *Attorney, Agent, or Firm* — Stoel Rives LLP (57) ABSTRACT

A microporous polyethylene battery separator material (212), for use in a flooded-cell type lead-acid battery, benefits from increased porosity, enhanced wettability, and exceptionally low electrical resistance when an electrolyte-soluble pore former is employed in the manufacturing process. The pore former (210) is soluble in electrolytic fluid and therefore dissolves in-situ in sulfuric acid during battery assembly. The dissolution of the pore former leaves behind additional, larger voids (220) in the separator material and thereby enhances ionic diffusion and improves battery performance.

22 Claims, 7 Drawing Sheets

IN-SITU PORE GENERATION IN LEAD-ACID BATTERY SEPARATOR USING ELECTROLYTE-SOLUBLE PORE FORMER

RELATED APPLICATIONS

This application claims benefit of U.S. Patent Application Nos. 60/954,530 and 60/938,137, filed Aug. 7 and May 15, 2007, respectively.

TECHNICAL FIELD

This disclosure relates to a battery separator for use in a lead-acid battery and, in particular, to a separator including an electrolyte-soluble sacrificial pore former that results in increased porosity and a change in pore size distribution after formation of the battery in the presence of an electrolytic fluid. In-situ pore generation results in lower electrical resistance and increased power capability of the battery.

BACKGROUND INFORMATION

Figure 1:
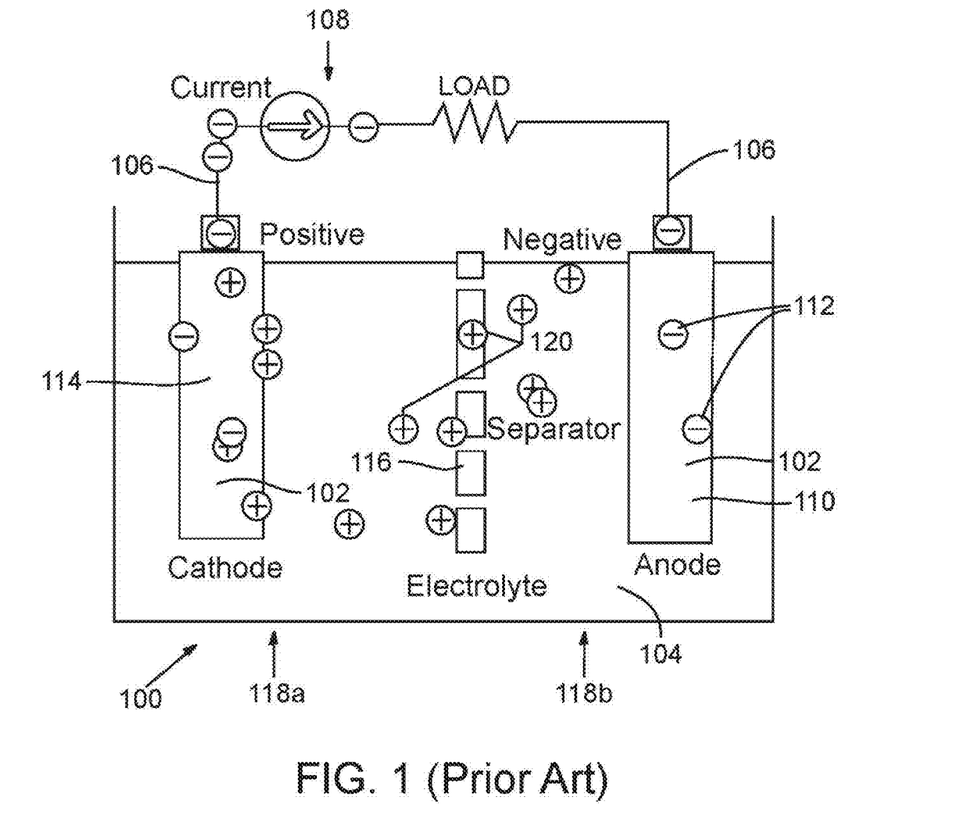
FIG. 1 is a diagram of a generic prior art galvanic cell, illustrating the position and function of a battery separator.

A battery, also known as a galvanic or voltaic cell, uses a chemical oxidation-reduction reaction to produce electric current for powering a load in an electric circuit. FIG. 1 is a diagram of a generic lead-acid cell 100, which includes two electrodes 102, each with one end dipped in an electrolytic fluid 104, typically sulfuric acid, and each with the other end connected by a wire 106 to an external electric circuit 108. Each electrode 102 separately undergoes one-half of an electrochemical oxidation-reduction reaction to either produce or consume free electric charge. A lead anode 110, or negative electrode, is oxidized in a reaction that supplies electrons 112. A lead oxide cathode 114, or positive electrode, is reduced in a reaction that consumes electrons. A main requirement is that electrodes 102 be kept separate from each other so that electron transfer is forced to occur through wire 106 in external electric circuit 108. A separator 116, or porous partition, is therefore used to divide cell 100 into a left compartment 118a and a right compartment 118b. Separator 116 prevents electrodes 102 from coming into physical contact with each other and short-circuiting cell 100. Separator 116 permits electrolyte 104 to reside in the pores of the separator material and thereby facilitates diffusion of ions 120 between left compartment 118a and right compartment 118b. If separator 116 is insufficiently porous, ionic current flow through electrolyte 104 is hindered and thereby causes a charge imbalance that impedes, and may ultimately arrest, the electrochemical reaction.

Battery separators 116 are complex multi-component membranes that dictate the mechanical and electrical performance of the battery. The "recombinant cell" and the "flooded cell" are two commercially available lead-acid battery designs that incorporate different types of separators. One type of recombinant cell, a valve regulated lead acid (VRLA) battery, typically includes an absorptive glass mat (AGM) separator composed of microglass fibers. While AGM separators provide excellent porosity (>90%), low electrical resistance, and uniform electrolyte distribution, they are relatively expensive and fail to offer precise control over the recombination process or the rate of oxygen transport within the electrolyte. Furthermore, AGM separators exhibit low puncture resistance, causing more frequent short circuits. Manufacturing costs for the fragile AGM sheets are high. In some cases, battery manufacturers select thicker, more expensive separators to improve puncture resistance, even though electrical resistance increases with thickness.

In a flooded cell battery, only a small portion of the electrolyte is absorbed into the separator. Materials for flooded cell battery separators typically include porous derivatives of cellulose, polyvinyl chloride (PVC), organic rubber, and polyolefins. Microporous polyethylene battery separators are commonly used because of their ultrafine pore size, which inhibits "dendritic" growth of metallic deposits (a short circuit risk), while providing low electrical resistance, and exhibits high puncture strength, good oxidation resistance, and excellent flexibility. Such properties facilitate sealing the battery separator into a pocket or envelope configuration into which a positive or negative electrode can be inserted. A main drawback of current commercial polyethylene separators is that their porosities are much lower than the porosities of AGM separators, generally ranging from 50%-60%.

The term "polyethylene separator" is something of a misnomer because microporous separators must contain large amounts of a siliceous filler such as precipitated silica to be sufficiently acid-wettable. The volume fraction of precipitated silica and its distribution in the separator generally control its electrical properties, while the volume fraction of polyethylene, more particularly ultrahigh molecular weight polyethylene (UHMWPE), and its degree of orientation in the separator generally control its mechanical properties. Precipitated silica is hydrophilic and, because of its high surface area and the presence of surface silanol groups, precipitated silica easily increases the acid wettability of the separator web and thereby lowers the electrical resistivity of the separator. In the absence of silica, sulfuric acid alone would not wet the hydrophobic web and therefore ion transport would be prevented, resulting in an inoperative battery. The silica dispersed wettability component of the separator typically accounts for between about 55% and about 80% by weight of the separator, i.e., the separator has a silica-to-polyethylene (PE) weight ratio of between about 2:1 and about 3.5:1.

During the manufacture of polyethylene battery separators, precipitated silica is typically combined with UHMWPE, a process oil, and various minor ingredients to form a separator mixture. The separator mixture is extruded at an elevated temperature (up to 250° C.) through a sheet die to form an oil-filled sheet of a designated thickness and profile, before extraction of most of the process oil. The sheet is then dried to form a microporous polyethylene separator, and then slit into an appropriate width for a specific battery design. The polyethylene separator is delivered in roll form to lead-acid battery manufacturers where the separator is fashioned into "envelopes." An electrode can then be inserted into a separator envelope to form an electrode package. Electrode packages are stacked so that the separator acts as a physical spacer and as an electrical insulator between positive and negative electrodes. The primary functions of the polyethylene contained in the separator are to provide mechanical integrity to the separator, so that it can be enveloped at high speeds, and to prevent grid wire puncture during battery assembly or operation. The polyethylene preferably has sufficient molecular chain entanglement to form a microporous web with high puncture resistance. An electrolyte is then introduced into the assembled battery to facilitate ionic conduction within the battery. Table 1 summarizes the functions of the battery separator components described above.

TABLE 1

| Battery separator components and their functions | |
|---|---|
| Component | Function |
| Polyethylene | Mechanical properties |
| Silica | Wettability and porosity |
| Residual Oil | Oxidation resistance |
| Antioxidant | Oxidation resistance |
| Voids/Pores | Ion conduction |

In response to the increased price of lead, battery manufacturers desire a separator with exceptionally low electrical impedence to achieve the same battery discharge rate with less active material (especially lead and lead oxide) in the electrodes. Some polyethylene separator manufacturers have used surfactants to promote separator wettability and lower electrical resistance through better wetting of available pores. However, surfactant is known to degrade lead-acid battery performance, and surfactants can migrate or they can decompose in a lead-acid battery environment. In an alternative approach, separator manufacturers have increased the percentage of process oil in their formulation in an attempt to increase the porosity of the finished separator, following extraction. However, increased oil content can cause more shrinkage during manufacturing so that the fixed rib pattern, which is imparted to the separator material during extrusion, cannot be maintained. In a third approach, subjecting the separator to treatment with a high-electric potential coronal discharge can be used to improve the wettability of the separator, but this effect is temporary. In a fourth approach, polymers containing functional groups that enhance wettability (e.g., ethylene-vinyl alcohol copolymers) can partly replace the hydrophobic UHMWPE polymer matrix of the separator; however, this can significantly reduce puncture resistance. It is therefore desirable to produce, with a cost-effective process, a microporous polyethylene separator having a material composition that provides good puncture resistance and high oxidation resistance while achieving very low electrical resistance.

SUMMARY OF THE DISCLOSURE

An oxidation-resistant, microporous polymer web exhibits high-strength mechanical properties and low electrical resistance. The microporous polymer web includes a solid matrix incorporating an UHMWPE component, a friable precipitated silica component, a sacrificial pore former, and residual process oil that plasticizes the polymer phase. The UHMWPE component is a polyolefin that provides high-strength mechanical properties to the web. The friable precipitated silica component is composed of predominantly discrete silica aggregates dispersed throughout the microporous polymer web to maintain low electrical resistance in the presence of an electrolyte. The sacrificial pore former is an inorganic filler that allows extrusion of the separator with traditional tooling but that dissolves in sulfuric acid after the battery is assembled. Dissolution of the sacrificial pore former results in an increase in separator porosity, modification to interconnectivity between mutually adjacent pores (i.e., tortuosity) of the separator, and enhanced pore size distribution. The beneficial effects include enhanced wettability in sulfuric acid and exceptionally low electrical resistance.

Additional aspects and advantages will be apparent from the following detailed description of preferred embodiments, which proceeds with reference to the accompanying drawings.

DETAILED DESCRIPTION OF PREFERRED EMBODIMENTS

The microporous polymer web described in the present disclosure is formed as a battery separator having a compositional window with a precipitated silica-to-polyethylene weight ratio of between about 1.8:1 to about 3.5:1. A suitable friable silica component is WB-37™, sold by PPG Industries, Inc. of Pittsburgh, Pa. The sacrificial pore former is included in amounts that range from 5%-100% of the silica included in the separator. Preferred sacrificial pore formers include, but are not limited to, magnesium oxide (MgO) and magnesium hydroxide ($Mg(OH)_2$).

The composition of the preferred sacrificial pore former material is chosen, not only on the basis of its solubility in electrolyte (e.g., sulfuric acid used in lead acid batteries), but also according to the effect of the in-situ reaction and its products on subsequent battery electrochemistry and function. For example, calcium carbonate, $CaCO_3$, is a satisfactory candidate based on solubility, but it has drawbacks. When it is combined with sulfuric acid, $CaCO_3$ forms $CaSO_4$ and carbonic acid, the latter of which decomposes into water and $CO_2$ gas. Both gas formation and precipitate formation are undesirable because they can hinder wetting and filling of separator pores. Therefore, as a sacrificial pore former, $CaCO_3$ is an example of a less preferred compound as compared with either $Mg(OH)_2$ or MgO.

Alternative potential candidate materials for soluble pore formers include the following cations: lithium, sodium, potassium, magnesium, calcium, zinc, aluminum, and tin; and the following anions: metaborate, carbonate, bi-carbonate, hydroxide, oxide, and sulfate. The solubilities of the combinations of these cations and anions in water at 10-25° C. are shown in Table 2. The solubility of the anhydrous form is used where alternate, hydrated versions are possible. These data are taken from the *Handbook of Chemistry and Physics*, 53rd ed., CRC Press, Cleveland, Ohio (1973) and *Lange's Handbook of Chemistry*, 13th ed., McGraw-Hill, New York (1985). For instances in which different values were reported, the higher one is indicated in the table.

TABLE 2

Solubilities of candidate compounds expressed as grams per 100 cubic centimeters (cc) of water

| | | metaborate $BO_2-$ | carbonate $CO_3-$ | bi-carbonate $HCO_3-$ | hydroxide $OH-$ | sulfate $SO_4-$ |
|---|---|---|---|---|---|---|
| lithium | Li | 2.57 | 1.54 | 5.5 | 12.8 | 26.1 |
| sodium | Na | 26 | 7.1 | 6.9 | 42 | 19.5 |
| potassium | K | 71 | 112 | 22.4 | 107 | 12 |
| magnesium | Mg | i | 0.0106 | na | 0.0009 | 26 |
| calcium | Ca | sl s | 0.0014 | na | 0.17 | 0.21 |
| zinc | Zn | s | 0.001 | na | v sl s | 53.8 |
| aluminum | Al | na | na | na | i | 31.3 |
| tin | Sn | na | na | na | na | 33 | symbols:
i = insoluble,
sl s = slightly soluble,
v sl s = very slightly soluble,
na = not found in handbook A subset of the compounds in Table 2 can be screened out based on poor solubility, reaction by-products, and cost. For instance, calcium sulfate exhibits low solubility in water, and it may be considerably less soluble in sulfuric acid because of the already considerable presence of sulfate anion. Sodium and potassium salts are highly soluble because of the high degree of dissociation achieved in aqueous solution. The low solubilities for the carbonates and hydroxides of magnesium and zinc can be overlooked because they convert rapidly to highly soluble sulfates in sulfuric acid. Hydroxides of lithium, sodium, and potassium are very hygroscopic and could be corrosive to processing equipment; therefore, they are less desirable candidates despite their high solubility and low cost. Lithium salts are generally more expensive than the other compounds and have no obvious performance advantages.

Two remaining compounds are sodium aluminum sulfate and potassium aluminum sulfate, which are generally referred to as alum and are used in large quantities as flocculants in water treatment. Thus, they should have low cost and are reasonably soluble (110 g/100 cc for sodium and 10.4 g/100 cc for potassium). Unfortunately, sodium aluminum sulfate and potassium aluminum sulfate compounds have low melting points: 60° C. and 92° C., respectively.

The resulting list of candidate compounds is presented below in Table 3. To gauge the relative effectiveness of these compounds, a pore-former solubility ratio is defined as the ratio of the equivalent volume of dry solid dissolved in 100 cc of water divided by the volume of pore former associated with 100 cc of acid in the battery. The list of candidate compounds presented in Table 3 is ordered by pore-former solubility ratio.

TABLE 3

Soluble pore formers sorted by solubility ratio

| | Formula | FW | density | solubility 100 cc water | pore-former solubility ratio |
|---|---|---|---|---|---|
| potassium metaborate | $KBO_2$ | 81.91 | 1.74 | 71 | 45.3 |
| zinc sulfate | $ZnSO_4$ | 161.43 | 3.54 | 53.8 | 16.9 |
| lithium sulfate | $Li_2SO_4$ | 109.94 | 2.221 | 26.1 | 13.1 |
| aluminum sulfate | $Al_2(SO_4)_3$ | 342.15 | 2.71 | 31.3 | 12.8 |
| sodium metaborate | $NaBO_2$ | 65.8 | 2.464 | 26 | 11.7 |
| magnesium sulfate | $MgSO_4$ | 120.37 | 2.66 | 26 | 10.9 |
| tin sulfate | $SnSO_4$ | 214.75 | 3.95 | 33 | 9.3 |
| lithium carbonate | $Li_2CO_3$ | 73.89 | 2.11 | 1.54 | 9.2 |
| magnesium carbonate | $MgCO_3$ | 84.32 | 2.958 | 0.0106 | 6.8 |
| magnesium hydroxide | $Mg(OH)_2$ | 58.33 | 2.36 | 0.0009 | 5.9 |
| potassium sulfate | $K_2SO_4$ | 174.27 | 2.662 | 12 | 5.0 |
| potassium carbonate | $K_2CO_3$ | 138.21 | 2.428 | 112 | 4.4 |
| potassium bicarbonate | $KHCO_3$ | 100.12 | 2.17 | 22.4 | 3.5 |
| sodium bicarbonate | $NaHCO_3$ | 84 | 2.159 | 6.9 | 2.9 |
| lithium metaborate | $LiBO_2$ | 49.75 | 1.397 | 2.57 | 2.0 |
| sodium sulfate | $Na2SO_4$ | 142.04 | 2.68 | 4.76 | 2.0 |
| sodium carbonate | $Na_2CO_3$ | 105.99 | 2.532 | 7.1 | 1.6 |

The derivation of this solubility ratio is given by way of the following sample calculation: A typical battery includes 1.3 $m^2$ of separator material and 3.3 liters of acid. A typical separator weighs 130 g/$m^2$ and has an apparent density of 0.57 g/cc. Thus, the separator volume associated with 100 cc of acid is given by:

$$(1.3)(130)/[(3.3)(0.57)(10)]=9.0 \text{ cc of separator}/100 \text{ cc acid.}$$

Assuming the soluble pore-former occupies 10% of the volume of the separator material, then the ratio of pore-former volume to acid is (0.1)(9)=0.9 cc/100 cc acid. For the purpose of ranking pore-former effectiveness, the pore-former solubility ratio is the volume of pore-former that dissolves in 100 cc of water divided by 0.9. In the case of carbonates, bicarbonates, and hydroxides, the solubility of the corresponding sulfate is used because these compounds react with the acid and become the sulfate. A further assumption in this evaluation is the use of solubility in water. Solubilities in acid tend to be somewhat lower for sulfate compounds because of the common ion effect. This will not affect the compounds that are converted to sulfates by the acid because no additional sulfate is involved.

Mg(OH)$_2$, available in powder form, readily dissolves in H$_2$SO$_4$ and therefore may be used as an in-situ sacrificial pore former to reduce electrical resistance in battery separators. Mg(OH)$_2$ powder is blended with precipitated silica (SiO$_2$), UHMWPE, process oil, and other minor ingredients such as one of both of antioxidants and stearates. The resulting mixture is extruded, extracted, and dried as described above to produce a separator. During the battery build process, the separator is exposed to a sulfuric acid electrolyte, H$_2$SO$_4$, contained in a battery case. Commercial batteries are commonly produced using either a one-step or a two-step formation process of filling the battery case. The one-step process entails filling the battery with H$_2$SO$_4$, which dissolves Mg(OH)$_2$ to form soluble MgSO$_4$, according to the chemical reaction:

$$H_2SO_4 + Mg(OH)_2 \rightarrow MgSO_4 + 2H_2O.$$

Magnesium sulfate thus produced becomes part of the supporting electrolyte within the battery. Following this transformation, space within the separator material previously occupied by Mg(OH)$_2$ is instead occupied by electrolytic fluid, thereby creating additional pores. Pore formation may also induce further wetting through neighboring pores, reducing electrical resistance of the separator even further. At this point, a voltage is applied to the electrodes, causing the electrodes to react with the acid and thereby may produce contaminants. For this reason, it may be desirable to use the two-step process, which entails, after following the one-step process, discarding the acid carrying the MgSO$_4$, and refilling the battery with fresh acid.

EXAMPLE

A RhinoHide™ separator is available from Entek International, Inc., of Lebanon, Oreg. Use of magnesium hydroxide as a sacrificial element in RhinoHide™ battery separators is successfully demonstrated by the following example: A preferred embodiment of a battery separator material including an electrolyte-soluble sacrificial pore former was produced on a 27 mm twin-screw extruder. The formula contained 43.3% dry weight of WB-37™ silica, manufactured by PPG Industries, Inc. of Pittsburgh, Pa., and 18.6% of UHMWPE (type GUR 4150, manufactured by Ticona, LLC of Florence, Ky.) such that the ratio SiO$_2$/PE=2.3, and 35.5% Mg(OH)$_2$ (Magnifin®, particle size distribution grade H-10A with vinyl silane coating, manufactured by Albemarle of Baton Rouge, La.). (The formula also included 2.0% carbon black concentrate, 0.3% antioxidant, and 0.3% lubricant in the extrusion.) The extrudate contained 65% Hydrocal™ 800 (HC-800 oil, available from Calumet Lubricants Co. of Indianapolis, Ind.). A control battery separator with an equivalent SiO$_2$/PE ratio of 2.3, no Mg(OH)$_2$, and 65% HC-800 was also extruded. Both separators were partly extracted to about 13% residual oil.

Figure 2:
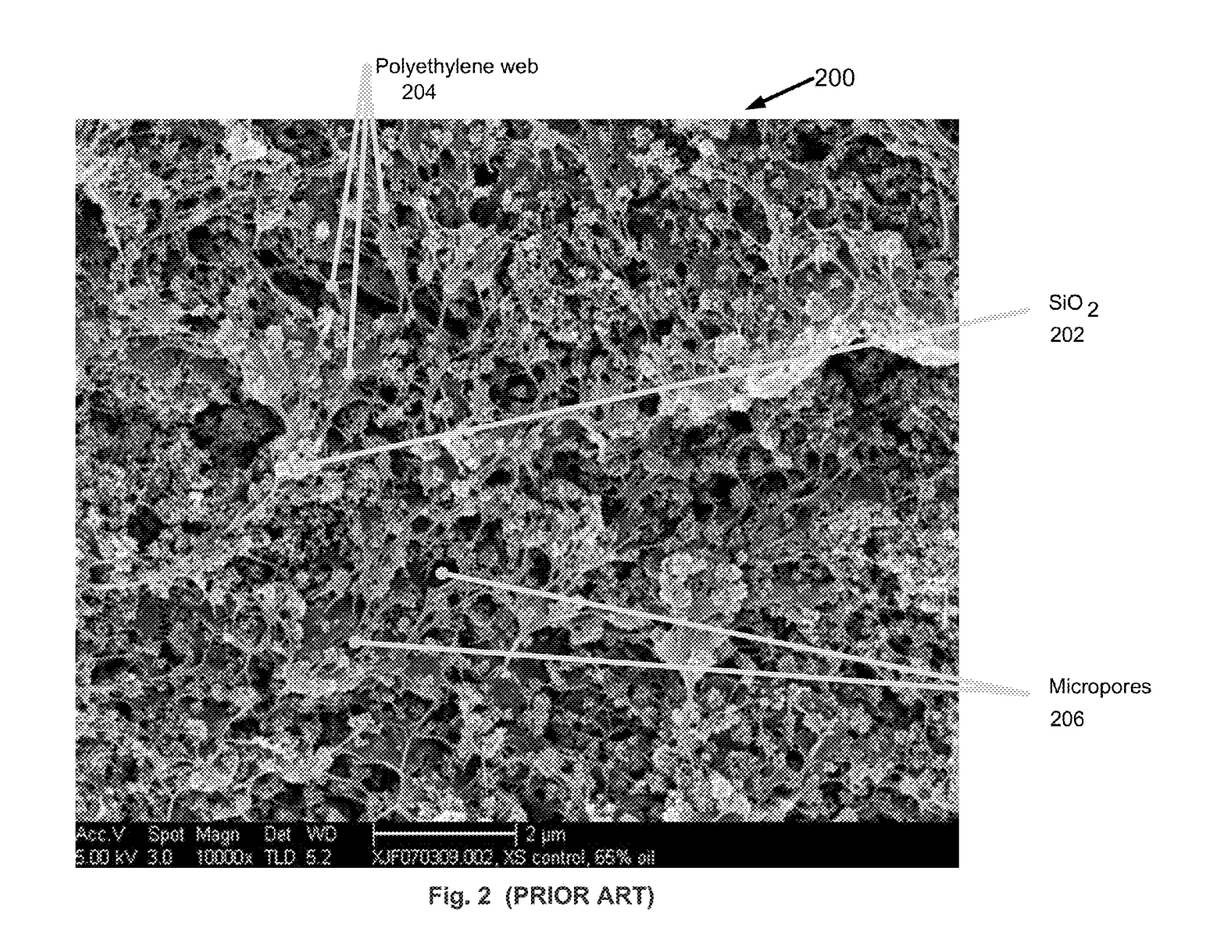
FIG. 2 is a scanning electron micrograph (SEM) of a fractured cross-section of prior art control separator, which does not contain $Mg(OH)_2$.
Figure 3:
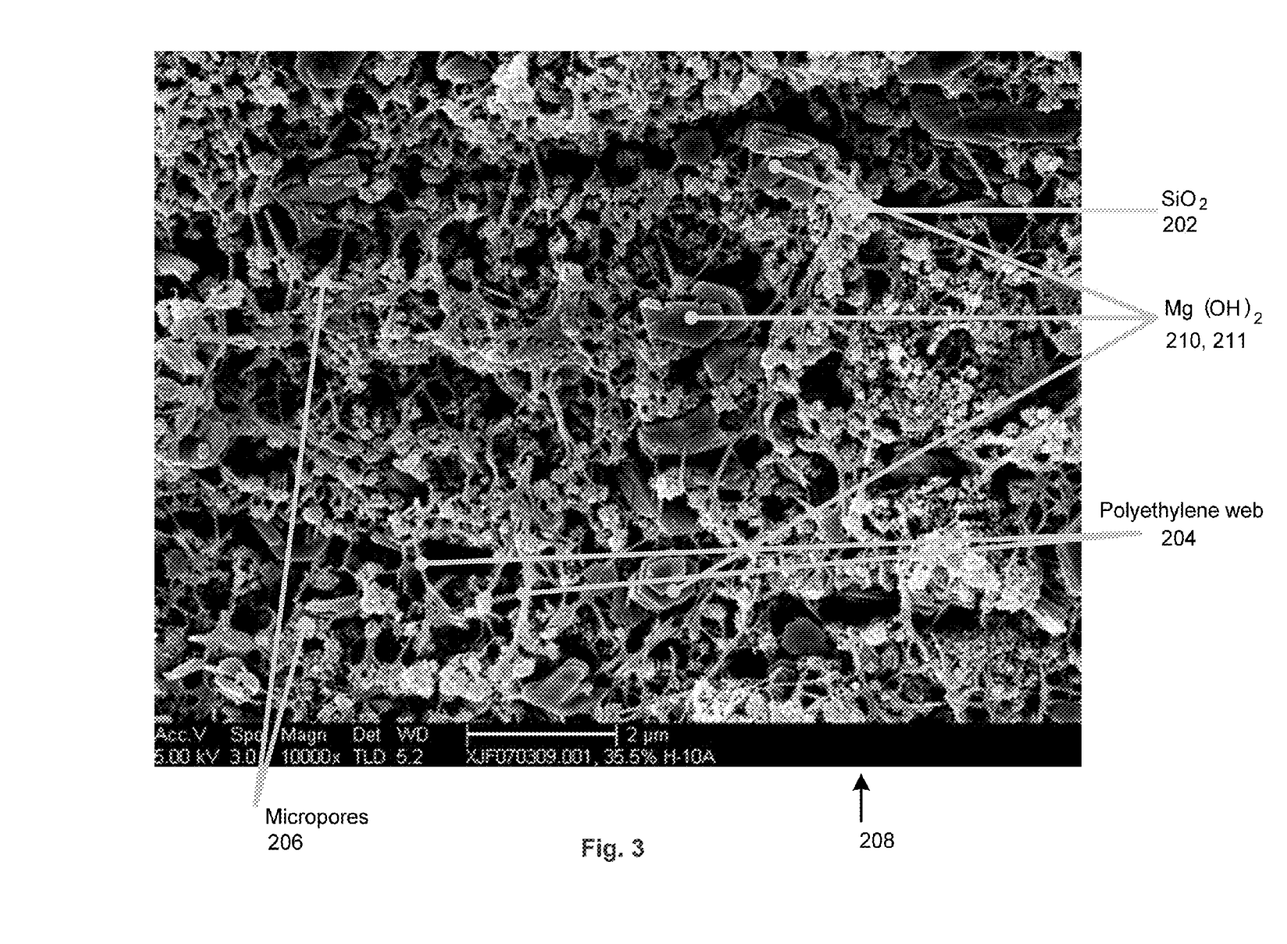
FIG. 3 is a SEM of a fractured cross-section of a $Mg(OH)_2$—containing battery separator that contains 35.5% $Mg(OH)_2$.

FIGS. 2 and 3 show magnified SEM images of samples of the resulting solid composite material with and without the Mg(OH)$_2$ component. The material shown in FIG. 2 is a control battery separator material 200, representing the current state of the art for polyethylene separators. Silica aggregates 202 resemble a dense overlay of white cauliflower—like structures on a background of sinuous polymer fibers 204. Silica aggregates 202 are further composed of primary particles having diameters of approximately 20 nm. Micropores 206 are evident as black voids located in-between polymer fibers 204 comprising the overall web.

A representative sample of composite separator material 208 shown in FIG. 3 is at an intermediate step of the preferred process of manufacturing a battery separator, with the sacrificial pore former still present and visible in the form of large Mg(OH)$_2$ particles 210. Mg(OH)$_2$ particles 210 resemble hexagonal-shaped flakes, with particle sizes 211 ranging from about 0.5 µm to about 2 µm. Mg(OH)$_2$ particles 210 appear to be uniformly distributed without interfering with the dispersion of silica aggregates 202 throughout polymer fibers 204.

Next, Mg(OH)$_2$ was dissolved from the samples of composite separator material 208, each measuring 24.2 cm$^2$, by immersing them in 200 cc of H$_2$SO$_4$ at room temperature (1.282 specific gravity) for 5 minutes. Glass mat layers were inserted in-between the samples to ensure that each sample was exposed to the acid. The samples were then flushed in 3500 cc of distilled water to remove any remaining acid. Weight loss resulting from removal of Mg(OH)$_2$ was calculated after drying the samples in an oven at 110° C. for 30 minutes. The same procedure was repeated on fresh samples with the acid soak time increased to 10 minutes and 20 minutes. Shrinkage in the machine direction (i.e., the direction of extrusion), cross-machine direction, and Z-direction (thickness) resulting from the dissolution of Mg(OH)$_2$ was also recorded.

Mg(OH)$_2$ in the separator was observed to completely dissolve in the H$_2$SO$_4$ electrolyte within the first 5 minutes. A measured weight loss value of 35.8% is slightly higher than the original weight percent of Mg(OH)$_2$ (35.5%) in the separator. Experiments testing loading levels of Mg(OH)$_2$ between 5% and 36% for various particle sizes showed that neither loading nor particle size affects the dissolution rate of Mg(OH)$_2$. Upon dissolving the Mg(OH)$_2$, the samples shrink 3.4% in the machine direction and about 1% in both the cross-machine direction and the Z-direction. In addition, the calculated porosity of the separator increased by 10%. This gain in porosity is very close to the 8% volume fraction of Mg(OH)$_2$, which corresponds to 35.5% by weight.

Figure 4:
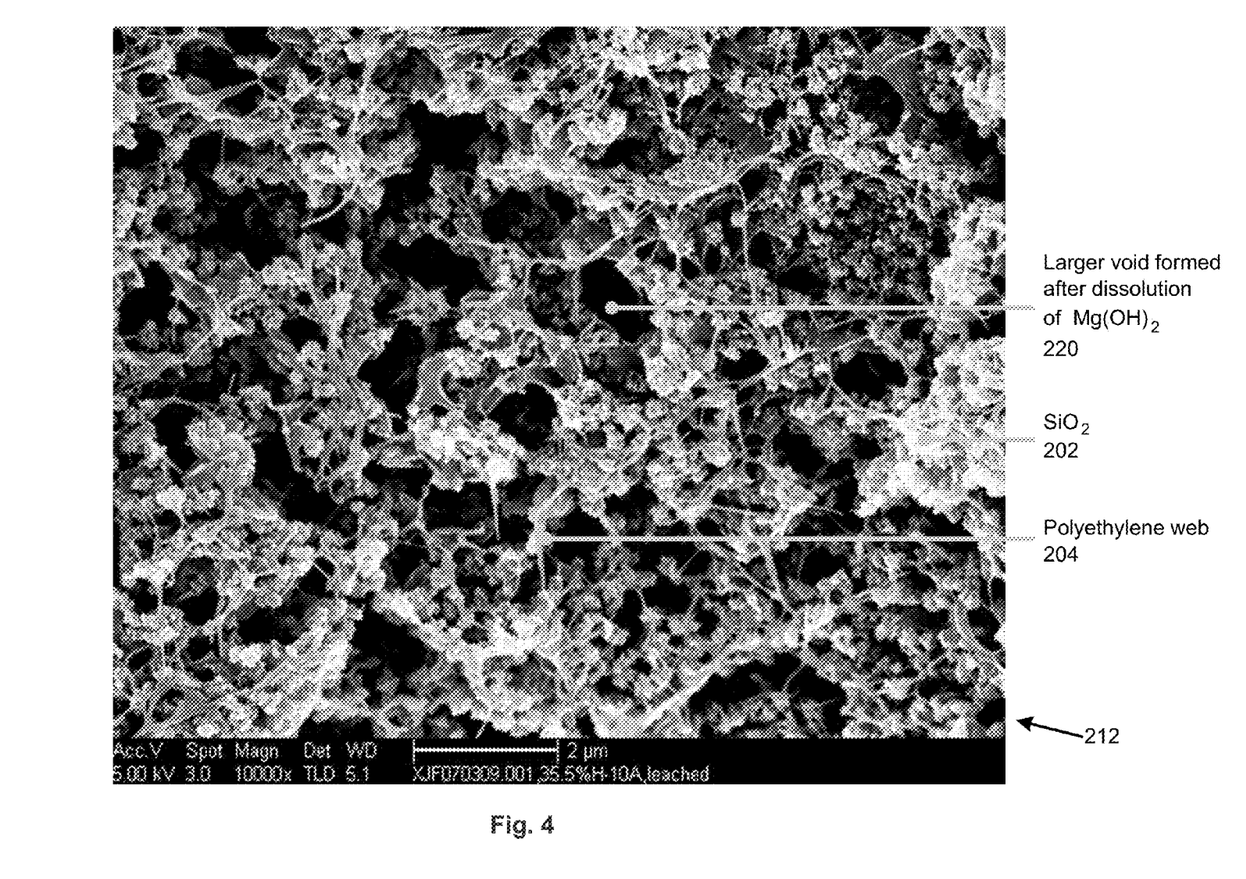
FIG. 4 is a SEM of a fractured cross-section of a $Mg(OH)_2$—containing separator after dissolving $Mg(OH)_2$ in sulfuric acid ($H_2SO_4$).

FIG. 4 is a magnified SEM image of a Mg(OH)$_2$-containing separator material 212 after soaking in H$_2$SO$_4$ for 20 minutes, and subsequent drying. In its final form, preferred Mg(OH)$_2$-containing separator material 212 can now be compared with the control battery separator material 200. As expected, the control sample made with 65% oil continues to exhibit micropores 206, seen in the micrograph in FIG. 2 as black voids, of size less than 1 µm as well as regions densely populated with polymer fibers 204. In contrast, preferred Mg(OH)$_2$-containing separator material 212 shown in FIG. 4 clearly exhibits much larger voids 220, of size greater than 1 µm. The sizes of these large pores are approximately equal to the sizes of the regions previously occupied by dissolved Mg(OH)$_2$ particles 210.

Figure 5:
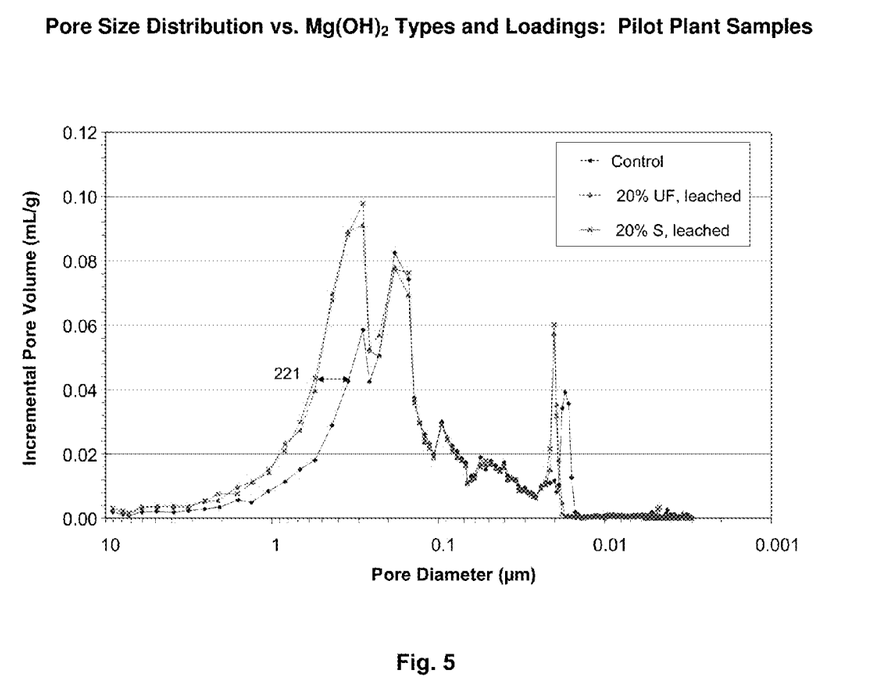
FIG. 5 is a graph showing a shift in pore size distribution within a battery separator material, after leaching 20% by weight of either of two industrial grades of $Mg(OH)_2$ sacrificial pore former is added.

FIG. 5 shows that, at a fixed loading level of 20% Mg (OH)$_2$, a clear shift 221 is evident in the distribution of pore sizes within the battery separator material to which Mg(OH)$_2$ has been added, causing the population of pores to be larger than that in a control sample with no sacrificial pore former added.

Figure 6:
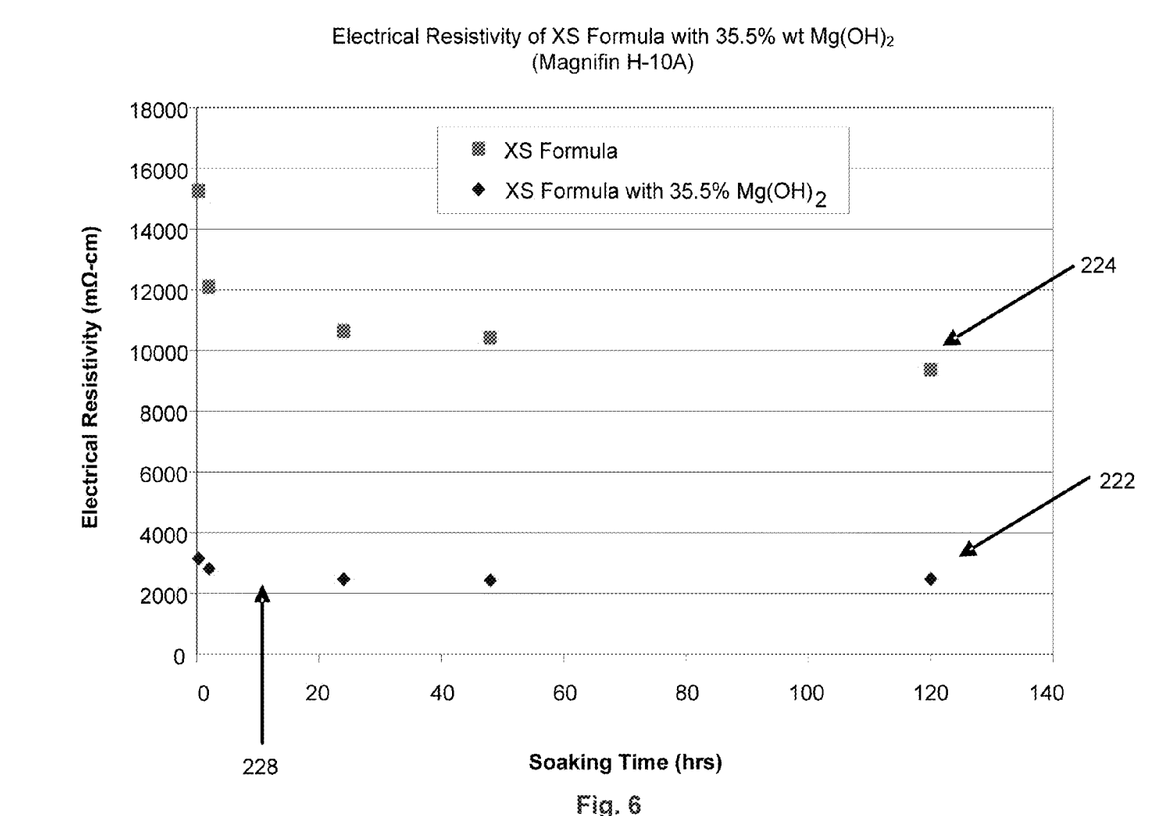
FIG. 6 is a graph showing the comparative relationship between electrical resistivities of a control separator and a $Mg(OH)_2$-containing separator as a function of $H_2SO_4$ soaking time.

Increases in porosity and decreases in tortuosity (interconnectivity between pores communicating through the thickness of the microporous polymer web) contribute to reducing the resistivity of a battery separator material. Because acid occupies the volume of the additional voids 220 created by dissolution of Mg(OH)$_2$, it follows that the electrical resistance of the preferred separator should be reduced. The graph in FIG. 6 compares the electrical resistivity of a soaked control battery separator 200 with that of a soaked Mg(OH)$_2$—containing battery separator 212. Five samples of each separator were soaked in two separate batches of H$_2$SO$_4$ (1000 cc, 1.28 specific gravity) at room temperature. After five minutes, the Mg(OH)$_2$—containing separator was transferred to a fresh batch of H$_2$SO$_4$ to minimize contamination of the Palico measuring system with MgSO$_4$. Electrical resistance measurements were made after soaking for a total of 20 minutes, two hours, 24 hours, 48 hours, and 120 hours; and corresponding electrical resistivity values characterizing the separator material were then calculated. As the data show, a fourfold reduction in electrical resistivity of Mg(OH)$_2$—containing separator material 212 was demonstrated for all soak times, compared to control separator 200. After a 20-minute soak, Mg(OH)$_2$—containing separator material 212 already showed an electrical resistivity 222 of about 3200 mΩcm, the lowest of any of the measured separators that were formed using the pilot extruder. Even after 100 hours, electrical resistivity 224 of control separator 200 continued decreasing slowly, whereas electrical resistivity 222 of Mg(OH)$_2$—containing separator material 212 exhibited immediate stabilization 228, indicating that Mg(OH)$_2$—ccontaining separator material 212 became saturated with electrolytic fluid much more quickly.

Figure 7:
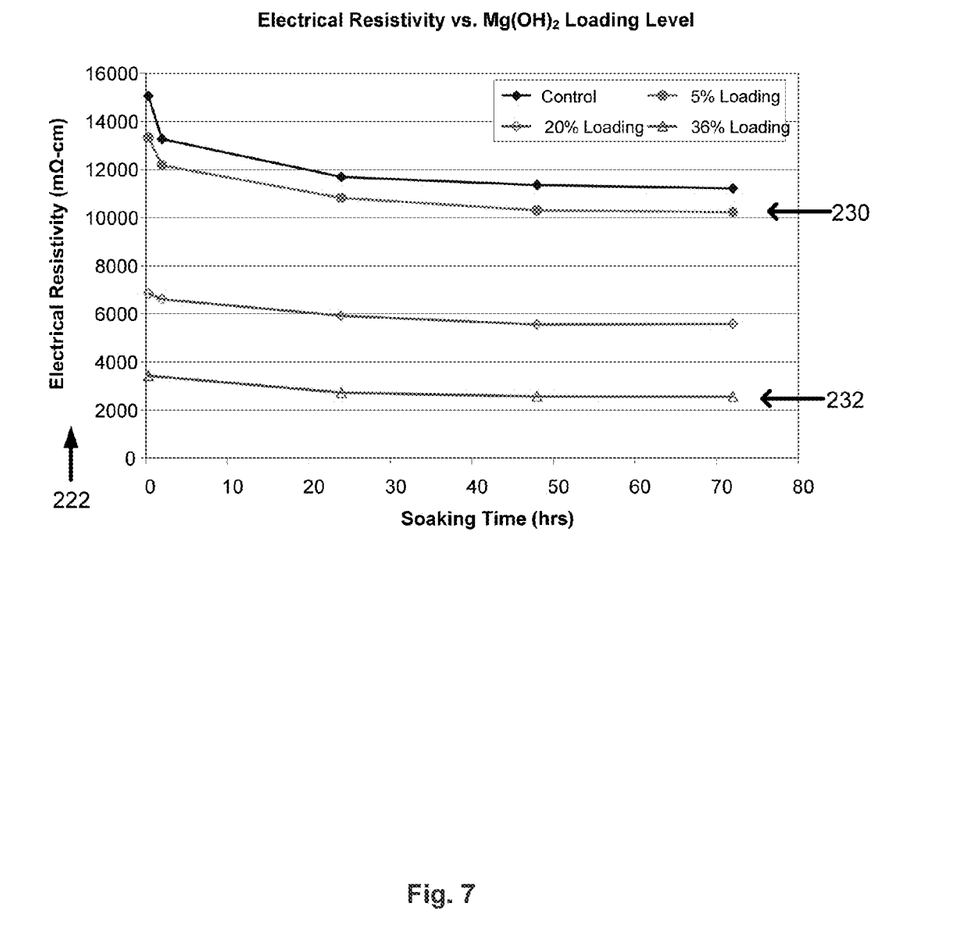
FIG. 7 is a graph showing the electrical resistivity as a function of soaking time for different weight percent loading levels of $Mg(OH)_2$ sacrificial pore former.

With reference to FIG. 7, electrical resistivity 222 of the separator was shown to scale with the weight percent of sacrificial pore former, as would be expected. As the weight percent of Mg(OH)$_2$ is increased from 5% (curve 230) to 36% (curve 232), electrical resistivity 222 drops in a substantially linear fashion, from about 10Ω-cm to about 3Ω-cm. With reference again to FIG. 1, replacing generic separator 116 with Mg(OH)$_2$—containing separator material 212 transforms generic lead-acid battery 100 into a desirable low-resistance battery. An electrochemical compatibility test was conducted on acid leachate prepared from a Mg(OH)$_2$-filled separator 116 to ensure that the presence and dissolution of Mg(OH)$_2$ into electrolytic fluid 104 have no deleterious effect on the lead acid electrochemistry of finished low-resistance battery 100. A scan of lead anode 110 in the low-resistance battery showed a beneficial 40-50 mV increase in hydrogen overpotential; a scan of lead oxide cathode 114 in the low-resistance battery showed no degradation in its electrical behavior.

It will be obvious to those having skill in the art that many changes may be made to the details of the above-described embodiments without departing from the underlying principles of the invention. The scope of the present invention should, therefore, be determined only by the following claims.

The invention claimed is:

1. In a microporous polymer web configured for use as a battery separator, the microporous polymer web including a three-dimensional matrix of polyolefin, a dispersed wettability component, and interconnecting pores that exhibit tortuosity and communicate through the thickness of the microporous polymer web, and the battery separator formed from the microporous polymer web characterized by a porosity, a pore size distribution, and an electrical resistivity when an electrolyte penetrates the interconnecting pores, the improvement comprising:
an electrolyte-soluble pore former distributed throughout the microporous polymer web such that the porosity, pore size distribution, and tortuosity are modified to reduce the electrical resistivity of the battery separator upon dissolution of the electrolyte-soluble pore former.

2. The microporous polymer web of claim 1, in which the electrolyte-soluble pore former includes magnesium hydroxide.

3. The microporous polymer web of claim 1, in which the electrolyte-soluble pore former includes magnesium oxide.

4. The microporous polymer web of claim 1, in which the electrolyte-soluble pore former includes a sulfate of zinc, lithium, aluminum, magnesium, tin, potassium, or sodium; or a carbonate of lithium, magnesium, potassium, or sodium.

5. The microporous polymer web of claim 1, in which the polyolelin comprises ultrahigh molecular weight polyethylene.

6. The microporous polymer web of claim 1, in which the wettability component includes a siliceous filler.

7. The microporous polymer web of claim 6, in which the siliceous filler includes precipitated silica.

8. A method of manufacturing a separator suitable for use in a lead-acid battery, comprising:
forming a microporous polymer web including a three-dimensional polymer matrix of polyolefin, a dispersed wettability component, interconnecting pores exhibiting a tortuosity and communicating through the thickness of the microporous polymer web, and an electrolyte-soluble pore former distributed throughout the microporous polymer web, and the microporous polymer web, in the absence of the electrolyte-soluble pore former, characterized by an electrical resistivity when an electrolyte penetrates the interconnecting pores; and
causing uptake of electrolytic fluid to dissolve the electrolyte-soluble pore former and thereby produce newly generated pores where the electrolyte-soluble pore former resided before dissolution, the newly generated pores modifying the tortuosity of the interconnecting pores to reduce the electrical resistivity of the microporous polymer web.

9. The method of claim 8, in which the causing of uptake of electrolytic fluid is accomplished by:
installing the microporous polymer web in a battery case;
introducing the electrolytic fluid into the battery case so that the microporous polymer web takes up the electrolytic fluid to dissolve the electrolyte-soluble pore former in situ, thereby to form the newly generated pores in locations previously occupied by the dissolved electrolyte-soluble pore former.

10. The method of claim 8, in which the polyolefin web comprises ultrahigh molecular weight polyethylene.

11. The method of claim 8, in which the dispersed wettability component includes a siliceous filler.

12. The method of claim 11, in which the siliceous filler includes precipitated silica.

13. The method of claim 8, in which the electrolyte-soluble pore former includes magnesium hydroxide.

14. The method of claim 8, in which the electrolyte-soluble pore former includes magnesium oxide.

15. The method of claim 8, in which the electrolyte-soluble pore former includes a sulfate of zinc, lithium, aluminum, magnesium, tin, potassium, or sodium; or a carbonate of lithium, magnesium, potassium, or sodium.

16. The method of claim 8, in which the newly generated pores are of sizes that are larger than the sizes of the interconnecting pores.

17. A lead-acid battery including a separator constructed in accordance with the method of claim 8.

18. A lead-acid battery, comprising:
multiple electrodes contained in a case tilled with an electrolytic fluid; and a battery separator in the form of a microporous polymer web that includes a three-dimensional matrix of polyolefin, interconnecting pores exhibiting a tortuosity and communicating through the thickness of the microporous polymer web, and newly generated pores produced by dissolution of an electrolyte-soluble pore former distributed throughout the microporous polymer web, the microporous polymer web, in the absence of the electrolyte-soluble pore former, characterized by an electrical resistivity, and the newly generated pores in the microporous polymer web decreasing the tortuosity of the interconnecting pores to reduce the electrical resistivity of the battery separator.

19. The battery of claim 18, in which the electrolyte-soluble pore former includes magnesium hydroxide.

20. The battery of claim 18, in which the electrolyte-soluble pore former includes magnesium oxide.

21. The battery of claim 18, in which the electrolyte-soluble pore former includes a sulfate of zinc, lithium, aluminum, magnesium, tin, potassium, or sodium; or a carbonate of lithium, magnesium, potassium, or sodium.

22. The battery of claim 18, in which the newly generated pores are of sizes that are larger than the sizes of the interconnecting pores.

* * * * *